F. H. PERRY.
PNEUMATIC TIRE.
APPLICATION FILED DEC. 30, 1908.
924,102.
Patented June 8, 1909.
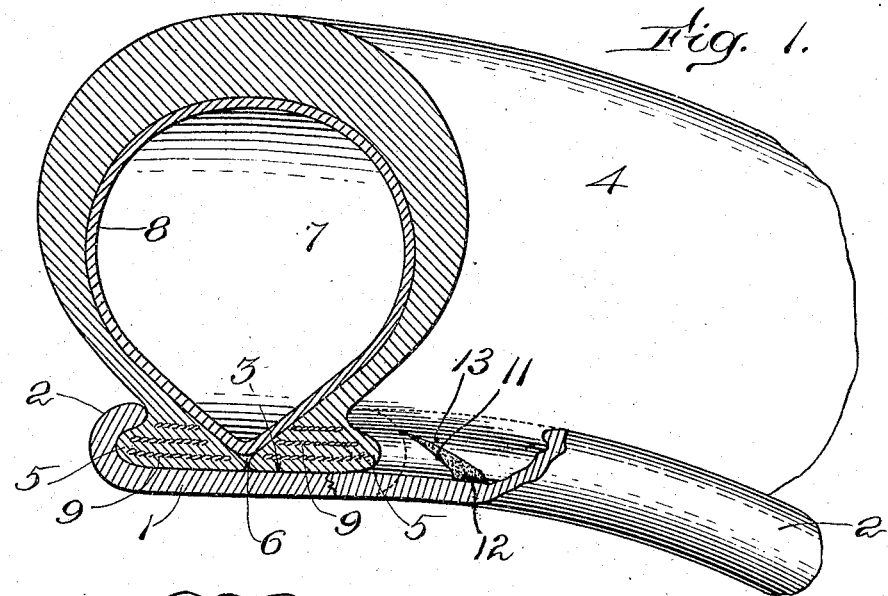
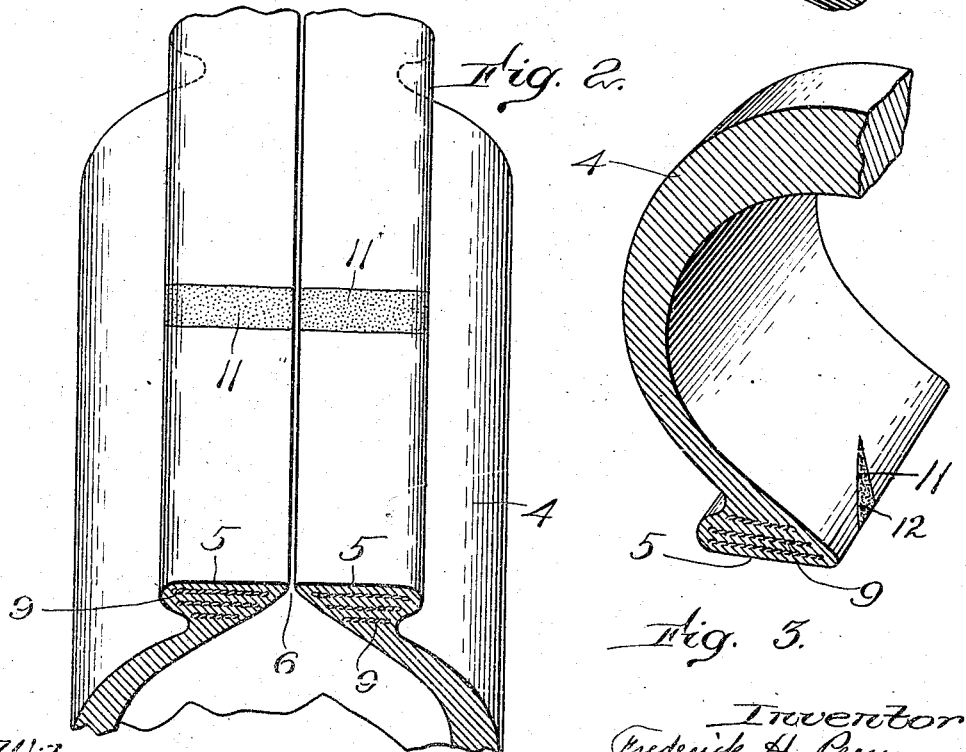

UNITED STATES PATENT OFFICE.

FREDERICK H. PERRY, OF BEVERLY, MASSACHUSETTS.

PNEUMATIC TIRE.

No. 924,102.          Specification of Letters Patent.          Patented June 8, 1909.

Application filed December 30, 1908. Serial No. 469,935.

*To all whom it may concern:*

Be it known that I, FREDERICK H. PERRY, a citizen of the United States, residing at Beverly, in the county of Essex and State of Massachusetts, have invented certain new and useful Improvements in Pneumatic Tires; and I do hereby declare the following to be a full, clear, and exact description of the invention, such as will enable others skilled in the art to which it appertains to make and use the same.

My invention relates to pneumatic tires for wheeled vehicles and more particularly that type of automobile tires known as clencher tires, in which an inflated inner tube is confined and protected by an outer and thicker tube generally known as a shoe. These shoes are stout and heavy annular tubes open upon the inner surface, or at that portion which fits into the rim of the wheel, in order to admit the insertion and removal of the inner tube as required, and the marginal edges of this rim portion of the shoe are formed in the shape of ribs or shoulders which take beneath the overhanging flanges which form the channel or groove of the rim of the wheel. The ribs or shoulders of the shoe which constitute the clencher portion, are made of a hard substantially non-elastic material and are generally strengthened by means of cords, strips of canvas and the like, which are embedded in the rubber during the process of manufacture and which extend annularly about the shoe. Thus it results that while the shoe is made of rubber this clencher portion is practically inelastic and much trouble and annoyance results when it becomes necessary to either remove or replace a shoe on the wheel. The overhanging flanges which form the groove or channel in the rim are somewhat larger in diameter than the diameter of the central opening in the shoe and in order to remove or replace a shoe it is necessary to spring the ribs of the clencher portion over the flanges and because of the practically inelastic character of the ribs of the shoe this is accomplished only under considerable difficulty and often with injury to the shoe.

The object of the present invention is to produce a clencher tire shoe which can be readily placed on the rim of a wheel or removed therefrom but which will be as securely held on the rim as clencher tire shoes heretofore devised and which will protect the inner tube in as efficient a manner.

With this object in view the invention consists in the shoe for pneumatic tires hereafter described and claimed.

The preferred form of the present invention is shown in the accompanying drawing, in which:—

Figure 1 shows in perspective a portion of a shoe and the rim of a wheel illustrating one form of my invention. Fig. 2 shows in perspective a portion of a shoe showing the under side or rim part, and Fig. 3 shows in perspective a portion of a shoe looking at the inner surface.

In the drawing, 1 indicates the rim of a wheel such as is usually used in connection with the so-called "clencher" tires and having along each edge the overhanging flanges 2 which form a channel 3, which receives the rim or clencher portion of the shoe.

The shoe 4 is, except as will be hereinafter set forth, of the usual construction, having the shouldered clencher portions or ribs 5 and being divided at 6 to give access to the inner chamber 7, which receives the inner inflatable tube 8. The clencher portions 5 are composed of the usual hard non-elastic material and are provided with the usual bands or strips 9 of canvas or other suitable material. In accordance with the present invention the clencher portions 5 of the shoe are cut through to the desired extent and in the desired number of places as shown at 11, and these cuts are filled with soft rubber or other suitable elastic material, as indicated at 12, said material being secured in any suitable manner, such for instance as by vulcanizing. The cuts 11 permit the clencher portions 5 to stretch readily so that the shoe can be readily removed from the rim or replaced thereon. The elastic filling material 12 in the cuts forms a smooth unbroken surface for the thin inflated tube 8 so that the tube when expanded cannot be pressed into the cuts. Also the elastic filling material in the cuts prevents water or dirt from working through the cuts onto the inner surface of the rim and thus preserves the inner surface of the rim from rust or abrasion. The filling material preferably extends to the outer surface of the clencher portions so that these portions have a continuous and smooth bearing surface and present substantially the same appearance as in an ordinary clencher tire shoe.

In accordance with the broader features of my invention the cuts 11 may extend through the clencher portions of the tire in any desired direction. It is preferred, however, to have the cuts extend in a direction oblique to the circumference of the tire as shown clearly in Figs. 1 and 3, as thereby a comparatively thin lip or edge 13 is formed on the outer external surface of the clencher portion of the tire which is engaged and pressed down by the overhanging portion of the rim 2. The compression of this thin lip by the rim effectually closes the cut at the point where it comes nearest to the edge of the rim and thus water, dirt and other foreign substances are more effectually prevented from passing through the cut to the inner surface of the rim than would be the case if the cuts were radial.

Having described my invention, I claim as new and desire to protect by Letters Patent of the United States:—

A shoe for a clencher pneumatic tire, the clencher portion of which is provided with a cut and an elastic filling secured in such cut and forming a part of the clencher portion, substantially as described.

In testimony whereof I affix my signature, in presence of two witnesses.

FREDERICK H. PERRY.

Witnesses:
WARREN G. OGDEN,
FRED O. FISH.